United States Patent
Siddiqui et al.

(10) Patent No.: US 11,062,365 B2
(45) Date of Patent: Jul. 13, 2021

(54) SYSTEMS AND METHODS FOR CORRECTING INCORRECT PRODUCT INFORMATION IN AN ELECTRONIC DATA CATALOG

(71) Applicant: WAL-MART STORES, INC., Bentonville, AR (US)

(72) Inventors: Omar Saeed Siddiqui, Sunnyvale, CA (US); Rohit Deep, Union City, CA (US); Zuzar Fakhruddin Nafar, Mountain View, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 534 days.

(21) Appl. No.: 15/467,854

(22) Filed: Mar. 23, 2017

(65) Prior Publication Data

US 2018/0276726 A1    Sep. 27, 2018

(51) Int. Cl.
*G06Q 30/00* (2012.01)
*G06Q 30/06* (2012.01)
(Continued)

(52) U.S. Cl.
CPC ....... *G06Q 30/0603* (2013.01); *G06F 16/215* (2019.01); *G06F 16/248* (2019.01);
(Continued)

(58) Field of Classification Search
None
See application file for complete search history.

(56) References Cited

U.S. PATENT DOCUMENTS 7,133,882 B1 * 11/2006 Pringle .................. G06Q 30/06
7,873,529 B2 *  1/2011 Kruger ................. G06Q 10/063
                                                              705/7.11
(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Bryan Cave Leighton Paisner LLP (57) ABSTRACT

Systems and methods including one or more processing modules and one or more non-transitory storage modules storing computing instructions configured to run on the one or more processing modules and perform acts of determining an accuracy score for existing product information using a first set of rules that compares the existing product information for the product with product information of other internal or external sources, determining if the accuracy score exceeds a predetermined accuracy threshold, automatically replacing incorrect product information in the existing product information with correct product information from the other sources if the accuracy score does not exceed the predetermined accuracy threshold, coordinating displaying of the existing product information with the correct product information replacing the incorrect product information on a webpage for the product on a website of the online retailer.

20 Claims, 5 Drawing Sheets

(51) Int. Cl.
  *G06N 20/00* (2019.01)
  *G06F 16/248* (2019.01)
  *G06F 16/951* (2019.01)
  *G06F 16/2457* (2019.01)
  *G06F 16/215* (2019.01)

(52) U.S. Cl.
  CPC ...... *G06F 16/24578* (2019.01); *G06F 16/951* (2019.01); *G06N 20/00* (2019.01); *G06Q 30/0625* (2013.01); *G06Q 30/0641* (2013.01)

(56) References Cited

U.S. PATENT DOCUMENTS

| | | | | |
|---|---|---|---|---|
| 8,832,116 | B1 * | 9/2014 | Chu | G06Q 10/0637 707/748 |
| 9,152,990 | B1 * | 10/2015 | Kanter | G06Q 30/0609 |
| 9,524,518 | B1 * | 12/2016 | Singer | G06K 9/6217 |
| 9,589,293 | B1 * | 3/2017 | Yalamanchi | G06Q 30/0625 |
| 9,779,445 | B1 * | 10/2017 | Hoberman | G06Q 30/0637 |
| 10,423,631 | B2 * | 9/2019 | Fischer | G06F 16/27 |
| 2005/0160014 | A1 * | 7/2005 | Moss | G06Q 30/00 705/26.61 |
| 2014/0337247 | A1 | 11/2014 | Stephens et al. | |
| 2016/0314425 | A1 * | 10/2016 | Cunningham | G06Q 10/06398 |
| 2017/0061129 | A1 * | 3/2017 | Bektchiev | H04L 9/00 |
| 2017/0093934 | A1 * | 3/2017 | Napper | G06Q 50/01 |
| 2017/0308534 | A1 * | 10/2017 | Ramirez | G06F 16/9535 |
| 2017/0323357 | A1 * | 11/2017 | Le Stunff | G06Q 30/0603 |
| 2018/0174220 | A1 * | 6/2018 | Jadhav | G06Q 30/0631 |

OTHER PUBLICATIONS

Business Editors; "Semantic Sciences Ships SemBuy 3.0 Catalog Engine Replacement for eMPC; Users Realize Greater Accuracy and Faster Availability of Product Catalogs"; Dec. 9, 2003; Business Wire (Year: 2003).*

* cited by examiner

405 – Accessing existing product information for a product in a data catalog of an online retailer.

410 – Determining an accuracy score for the existing product information using a first set of rules that compares the existing product information for the product with (1) internal product information of one or more internal sources internal to the online retailer, or (2) external product information of one or more external sources external to the online retailer.

415 – Determining if the accuracy score exceeds a predetermined accuracy threshold.

420 – Receiving a search query from a user of a website of the online retailer.

425 – Determining that one or more product attributes of the existing product information of a portion of the plurality of products are related to the search query.

430 – Coordinating displaying of search results for the online query without the portion of the plurality of products if the accuracy score for the one or more product attributes of the existing product information of the portion of the plurality of products is below the predetermined accuracy threshold..

435 – Automatically replacing incorrect product information in the existing product information with correct product information from the internal product information or the external product information if the accuracy score does not exceed the predetermined accuracy threshold.

440 – Coordinating displaying of the existing product information with the correct product information replacing the incorrect product information on a webpage for the product on a website of the online retailer.

SYSTEMS AND METHODS FOR CORRECTING INCORRECT PRODUCT INFORMATION IN AN ELECTRONIC DATA CATALOG

TECHNICAL FIELD

This disclosure relates generally to correcting incorrect product information in electronic data catalogs.

BACKGROUND

Data catalogs of an online retailer often comprise product information for millions of products sold by the online retailer. A concern for online retailers is whether the product information in the data catalog is correct. For example, an online retailer does not want the product information stored in the data catalog to include that a black shirt is red.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of accessing existing product information for a product in a data catalog of an online retailer. The one or more storage modules can be further configured to run on the one or more processing modules and perform an act of determining an accuracy score for the existing product information using a first set of rules that compares the existing product information for the product with (1) internal product information of one or more internal sources internal to the online retailer, or (2) external product information of one or more external sources external to the online retailer.

The one or more storage modules can be further configured to run on the one or more processing modules and perform an act of determining if the accuracy score exceeds a predetermined accuracy threshold. The one or more storage modules can be further configured to run on the one or more processing modules and perform an act of automatically replacing incorrect product information in the existing product information with correct product information from the internal product information or the external product information if the accuracy score does not exceed the predetermined accuracy threshold. The one or more storage modules can be further configured to run on the one or more processing modules and perform an act of coordinating displaying of the existing product information with the correct product information replacing the incorrect product information on a webpage for the product on a website of the online retailer.

Various embodiments include a method. The method can include accessing existing product information for a product in a data catalog of an online retailer. The method also can include determining an accuracy score for the existing product information using a first set of rules that compares the existing product information for the product with (1) internal product information of one or more internal sources internal to the online retailer, or (2) external product information of one or more external sources external to the online retailer. The method also can include determining if the accuracy score exceeds a predetermined accuracy threshold. The method also can include automatically replacing incorrect product information in the existing product information with correct product information from the internal product information or the external product information if the accuracy score does not exceed the predetermined accuracy threshold. The method also can include coordinating displaying of the existing product information with the correct product information replacing the incorrect product information on a webpage for the product on a website of the online retailer.

A number of embodiments can include a system. The system can include one or more processing modules and one or more non-transitory storage modules storing computing instructions configured to run on the one or more processing modules. The one or more storage modules can be configured to run on the one or more processing modules and perform an act of accessing existing product information for each product of a plurality of products in a data catalog of an online retailer, the existing product information comprising one or more product attributes. The one or more storage modules can be further configured to run on the one or more processing modules and perform an act of determining an accuracy score for the one or more product attributes of the existing product information of each product of the plurality of products using a first set of rules that compares the existing product information for the each product with (1) internal product information of one or more internal sources internal to the online retailer, or (2) external product information of one or more external sources external to the online retailer. The one or more storage modules can be further configured to run on the one or more processing modules and perform an act of determining if the accuracy score for the one or more product attributes of the existing product information of each product of the plurality of products is below a predetermined accuracy threshold. The one or more storage modules can be further configured to run on the one or more processing modules and perform an act of receiving a search query from a user of a web site of the online retailer. The one or more storage modules can be further configured to run on the one or more processing modules and perform an act of determining that the one or more product attributes of the existing product information of a portion of the plurality of products are related to the search query. The one or more storage modules can be further configured to run on the one or more processing modules and perform an act of coordinating displaying of search results for the online query without the portion of the plurality of products if the accuracy score for the one or more product attributes of the existing product information of the portion of the plurality of products is below the predetermined accuracy threshold.

Figure 1:
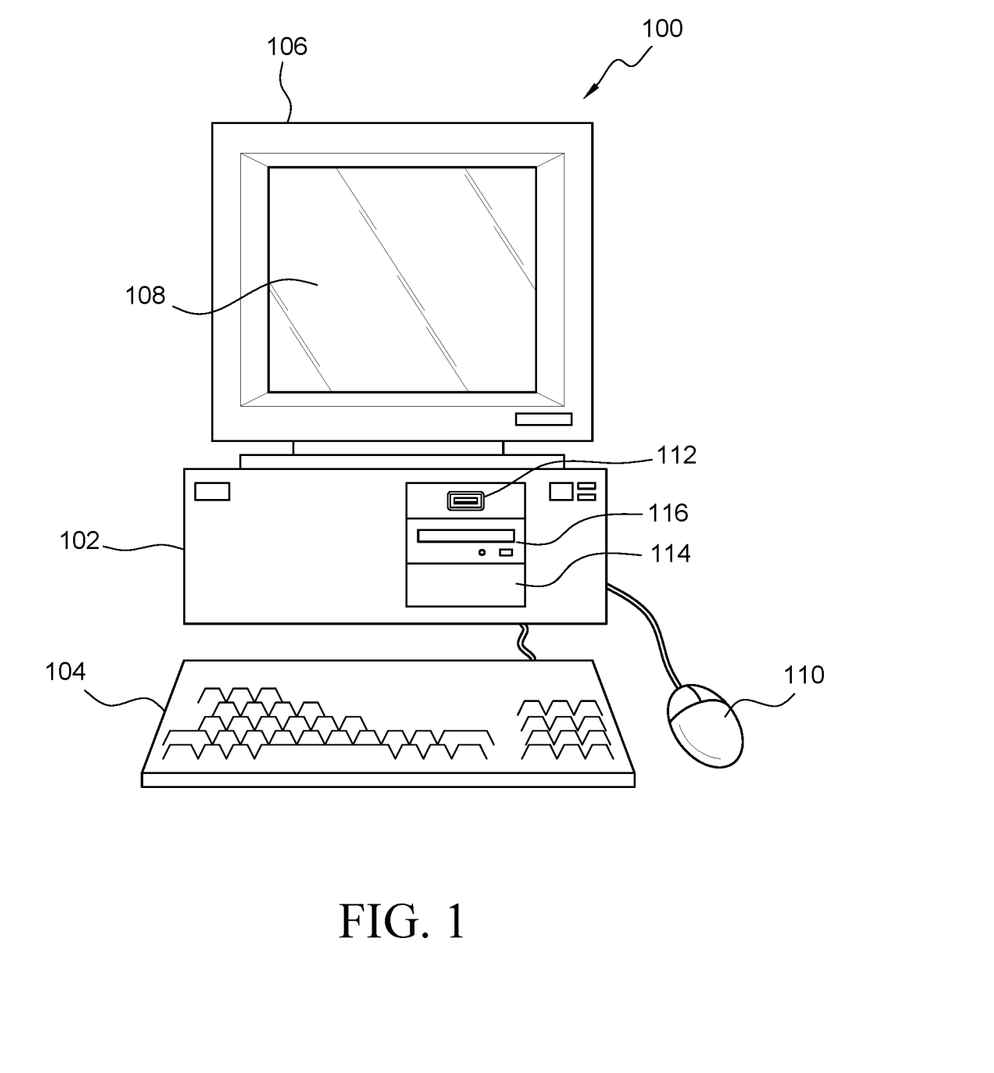
FIG. 1 illustrates a front elevational view of a computer system that is suitable for implementing various embodiments of the systems disclosed in FIGS. 3 and 5.
Figure 2:
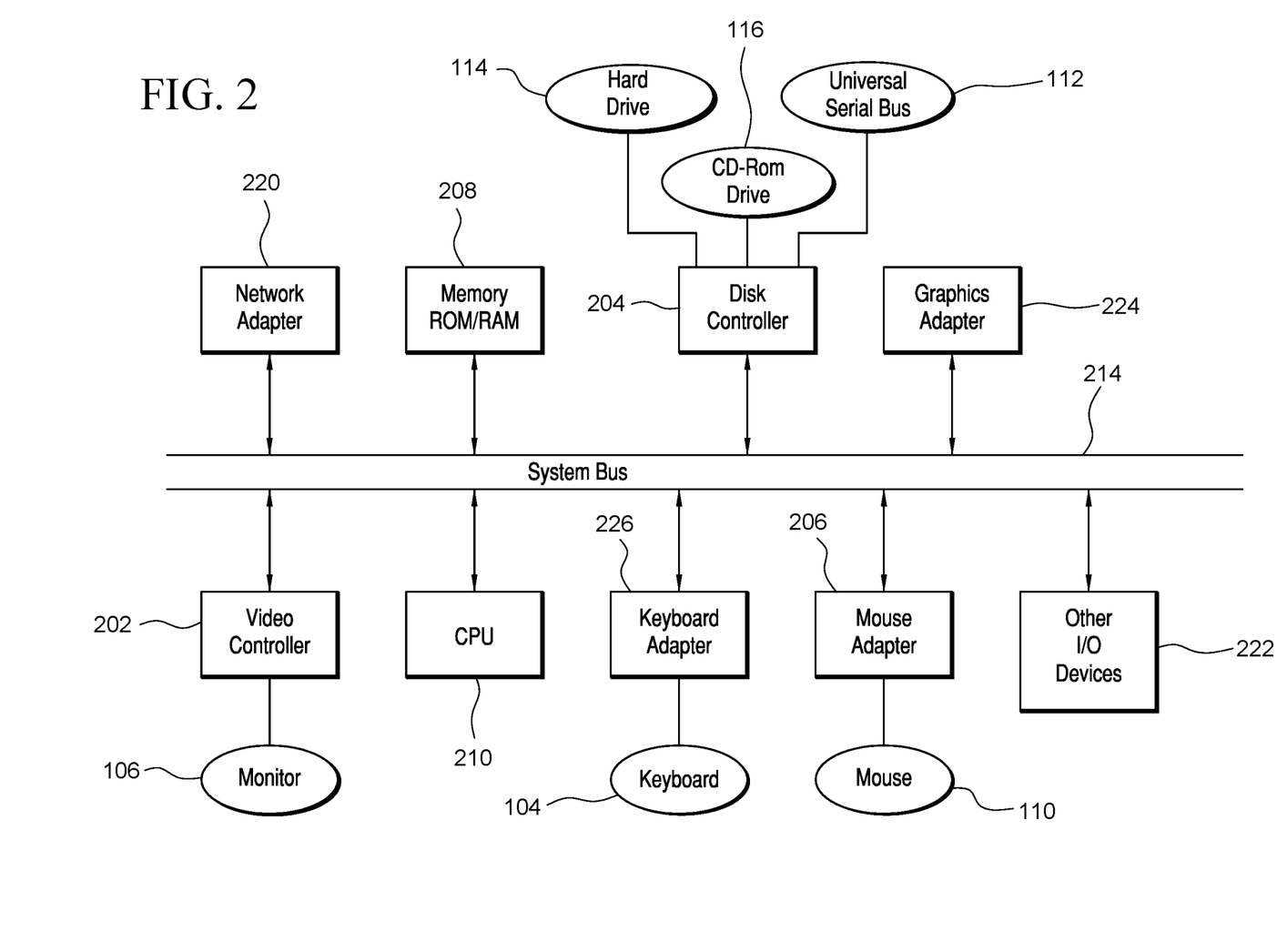
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
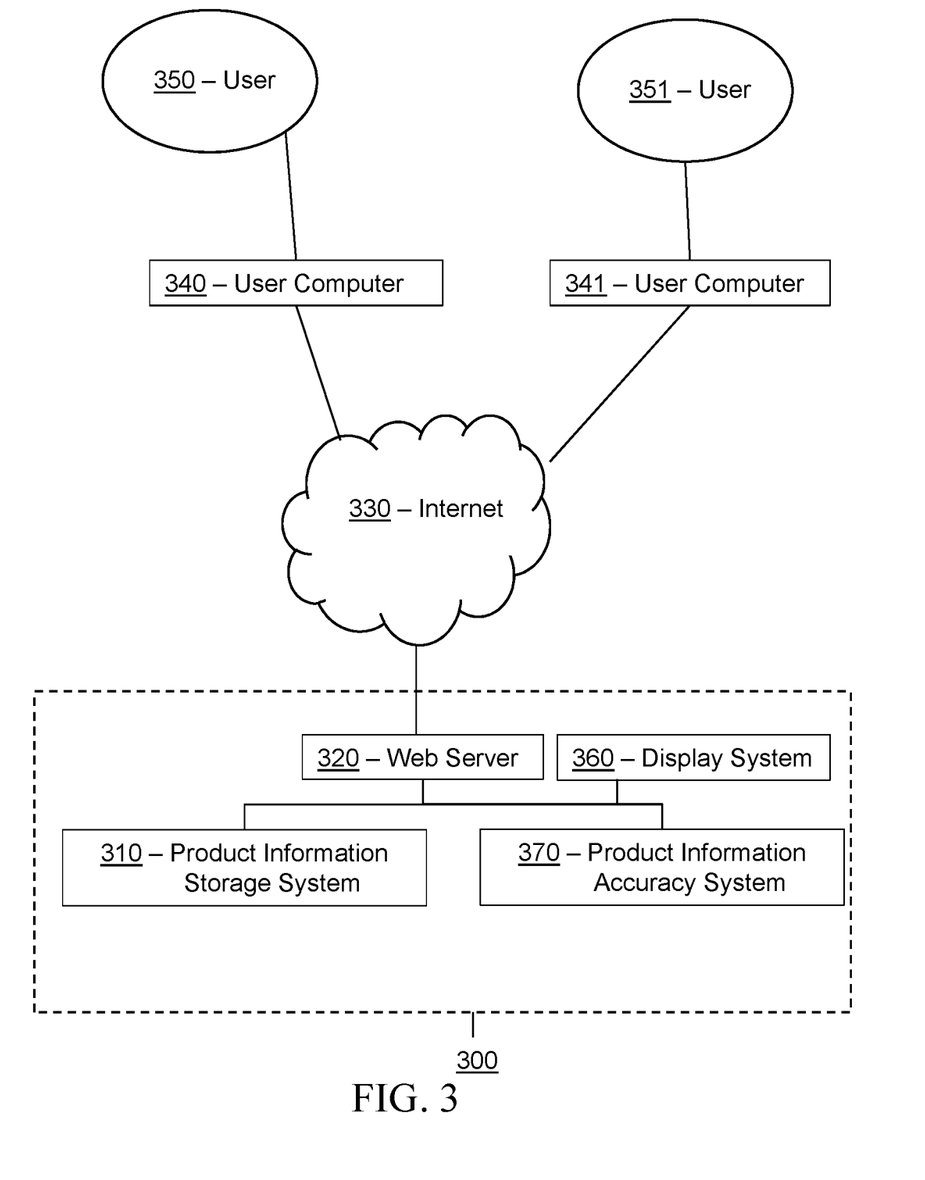
FIG. 3 illustrates a representative block diagram of a system, according to an embodiment.

Turning ahead in the drawings, FIG. 3 illustrates a block diagram of a system 300 that can be employed for correcting incorrect product information in an electronic data catalog. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include product information storage system 310, a web server 320, a display system 360, and a product information accuracy system 370. Product information storage system 310, web server 320, display system 360 and product information accuracy system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of product information storage system 310, web server 320, display system 360 and/or product information accuracy system 370. Additional details regarding product information storage system 310, web server 320, display system 360 and product information accuracy system 370 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, product information storage system 310, web server 320, display system 360 and/or product information accuracy system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) product information storage system 310, web server 320, display system 360 and/or product information accuracy system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of product information storage system 310, web server 320, display system 360 and/or product information accuracy system 370. In a similar manner, the processing module(s) and the memory storage module(s) can be local and/or remote to each other.

In many embodiments, product information storage system 310, web server 320, display system 360 and/or product information accuracy system 370 can be configured to communicate with one or more user computers 340 and 341. In some embodiments, user computers 340 and 341 also can be referred to as customer computers. In some embodiments, product information storage system 310, web server 320, display system 360 and/or product information accuracy system 370 can communicate or interface (e.g., interact) with one or more customer computers (such as user computers 340 and 341) through a network or internet 330. Internet 330 can be an intranet that is not open to the public. Accordingly, in many embodiments, product information storage system 310, web server 320, display system 360 and/or product information accuracy system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, product information storage system 310, web server 320, display system 360 and/or product information accuracy system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between product information storage system 310, web server 320, display system 360 and/or product information accuracy system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
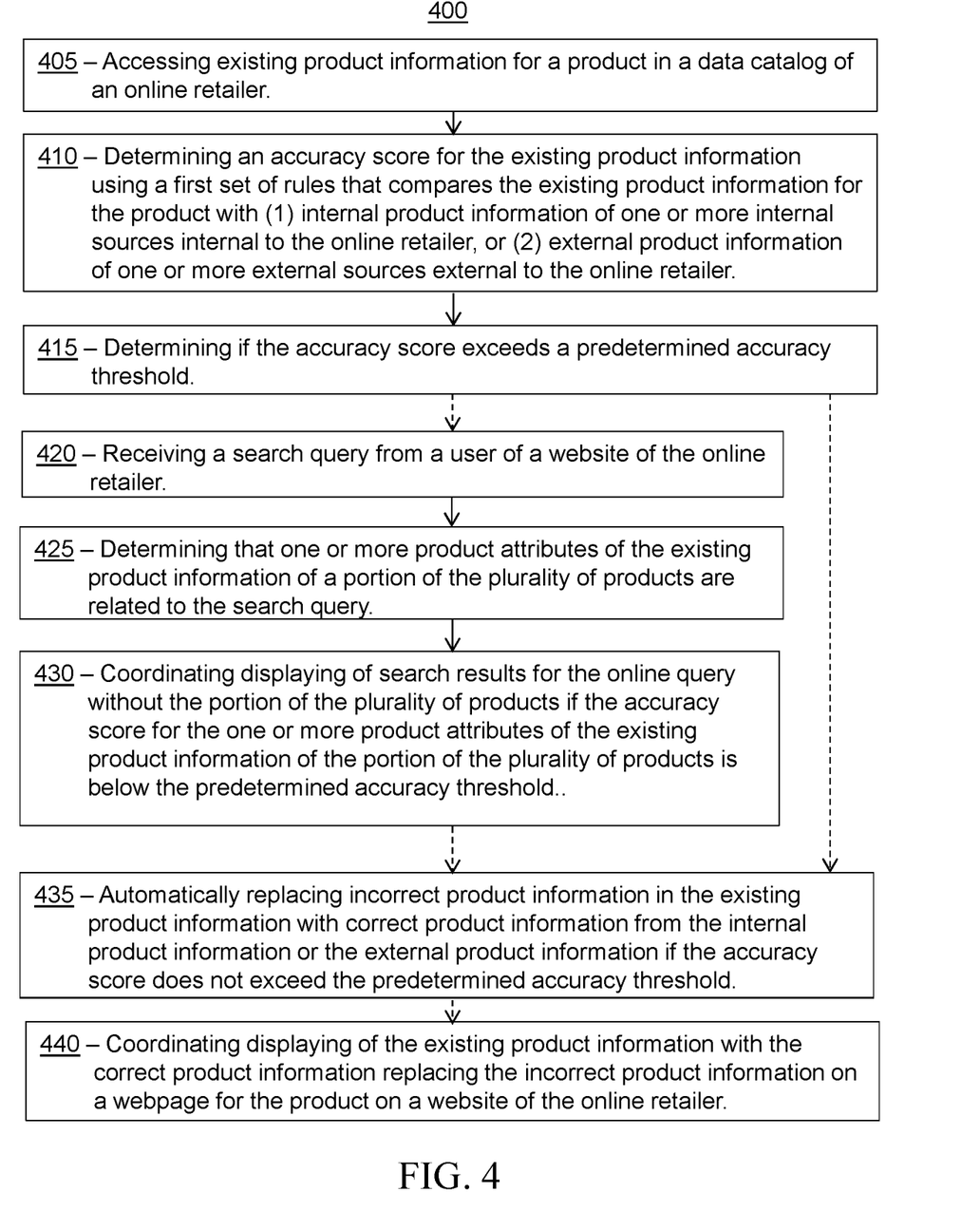
FIG. 4 is a flowchart for a method, according to certain embodiments.
Figure 5:
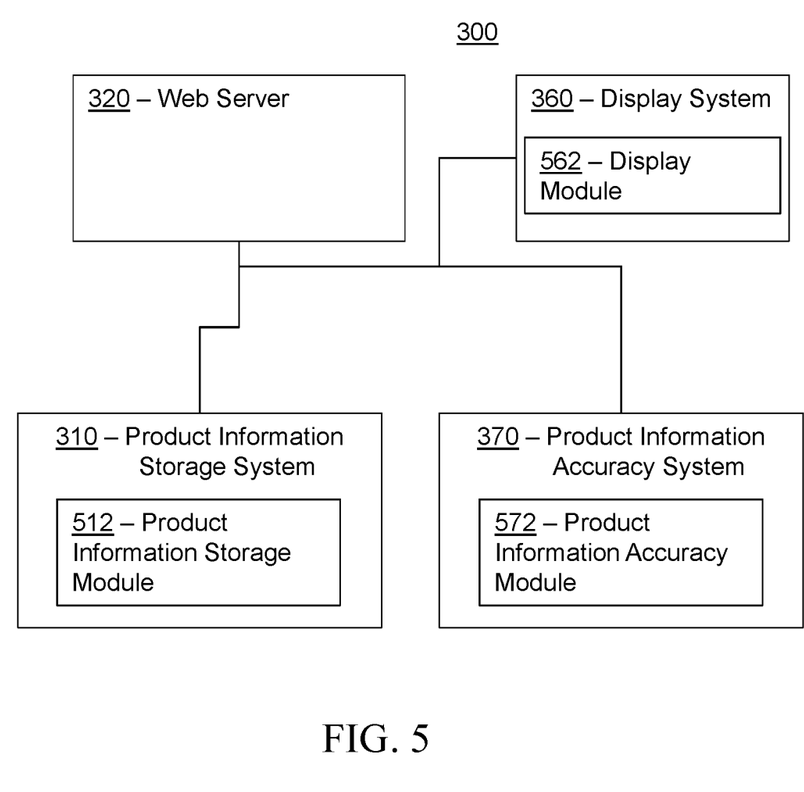
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, and/or 572 (FIG. 5). Such non-transitory memory storage modules can be part of a computer system such as product information storage system 310, web server 320, display system 360 and/or product information accuracy system 370 (FIGS. 3 & 5). The processing module(s) can be similar or identical to the processing module(s) described above with respect to computer system 100 (FIG. 1).

Data catalogs of an online retailer often comprise product information for millions of products sold by the online retailer. A concern for online retailers is whether the product information in the data catalog is correct. For example, an online retailer does not want the product information stored in the data catalog to include that a black shirt is red. One or more embodiments of method 400 allow an online retailer to check and, if necessary, correct the accuracy of the product information in the data catalog of the online retailer. It is noted that an online retailer as described herein can include a retailer that is exclusively online, or a retailer that includes both an online commerce website and also a brick and mortar store.

Method 400 can comprise an activity 405 of accessing existing product information for a product in a data catalog of an online retailer. The existing product information can comprise one or more product attributes. Product attributes in the existing product information can comprise but are not limited to brand, color, product dimensions, etc. In some embodiments, activity 405 can comprise using a distributed network comprising distributed memory architecture to access or receive existing product information for a product in a data catalog of an online retailer. This distributed architecture can reduce the impact on the network and system resources to reduce congestion in bottlenecks while still allowing data to be accessible from a central location. In some embodiments accessing the online catalog is performed while a user is shopping on a website of the online retailer, e.g., when a user enters a search query, browses categories of products, and/or sorts products. In some embodiments, accessing the catalog is performed when system 300 (FIG. 3) receives new items and/or on a daily or weekly basis.

In many embodiments, an online retailer can compare the existing product information to other product information obtained internally and/or externally. For example, returning to FIG. 4, method 400 also can comprise an activity 410 of determining an accuracy score for one or more product attributes of the existing product information using a first set of rules that compares the existing product information for the product with (1) internal product information of one or more internal sources internal to the online retailer, or (2) external product information of one or more external sources external to the online retailer. As used herein, internal product information of one or more internal sources can comprise any product information collected by the online retailer during the normal course of business for the online retailer. For example, in some embodiments, the online retailer can perform machine learning-based attribute extraction algorithms on a title and description for a product to see if the title and description for the product match information contained within the metadata fields for the product. For example, if the title of a shoe includes the brand of Nike, the title can be checked using a machine learning-based attribute extraction algorithm to discern if Nike is the brand of the product with which the title is associated.

In some embodiments, the internal product information can be collected by the online retailer from one or more sellers or suppliers that also sell the product on the website of the online retailer. The internal product information, then, can comprise product information not collected for the specific purpose of determining accuracy of the existing product information.

Furthermore, as used herein, external product information of one or more external sources can comprise any product information collected from third parties for the purpose of determining accuracy of product information. For example, the external product information from one or more external sources can comprise product information purchased from one or more third-party resources. By way of another example, the external product information from one or more third-party sellers and/or external sources can comprise product information extracted from a web site of a competitor to the online retailer.

In some embodiments that comprise an activity of comparing the existing product information to internal product information, determining the accuracy score for the existing product information using the first set of rules also can comprise determining if the existing product information matches the internal product information in a database of the online retailer using machine-learned attribute extraction algorithms. This determination allows the online retailer to check if the product attributes of the existing product information stored in the data catalog of the online retailer agrees with what is listed in the title and description of the database of the internal product information. Method 400 also can comprise automatically marking the existing product information if the existing product information does not match the internal product information. For example, the existing product information that does not match the internal product information can be flagged for manual review.

In many embodiments, method 400 also can comprise collecting feedback on the activity of comparing the existing product information to internal product information and modifying the one or more machine-learned attribute extraction algorithms to detect true mismatches and disregard mismatches that are not true mismatches. For example, initially the one or more machine-learned attribute extraction algorithm may flag existing product information because a brand "LG" does not match a brand "LG Electronics." After modifying the one or more machine-learned algorithms, the one or more machine-learned algorithms can recognize that the brands "LG" and "LG Electronics" are a true match.

In many embodiments, method 400 also can comprise determining an accuracy confidence of one or more product attributes of the existing product information. In some embodiments, one or more of the following factors can be considered in determining the accuracy confidence: the number of external sources; the trustworthiness of the external sources; and/or the values for each of the sources. For example, a value from a trusted source might be selected over two low-trust sources with values that agree with one another. On the other hand, three sources with values that agree with one another can be selected over a highly-trusted source. The accuracy confidence can comprise a high accuracy confidence or a low accuracy confidence. In some embodiments, the high accuracy confidence comprises approximately 50% to approximately 99% confidence that the one or more product attributes of the existing product information is accurate. It is noted that, in some embodiments, the high accuracy confidence cannot be 100% because the existing product information has not yet been compared to one or more external sources.

In some embodiments that comprise an activity of comparing the existing product information to external product information, determining the accuracy score for the existing product information using the first set of rules can comprise crawling a web site of one or more first external sources of the one or more external sources to collect first external product information of the external product information. Crawling a web site of one or more first external sources can comprise using a web crawler configured to systematically browse websites of one or more first external sources. Furthermore, in some embodiments that comprise an activity of comparing the existing product information to external product information, determining the accuracy score for the existing product information using the first set of rules can comprise requesting second external product information of the external product information from one or more second external sources of the one or more external sources. Requesting the second external product information can comprise purchasing or otherwise obtaining the external product information from one or more third-party category specialists.

In many embodiments, method 400 also can comprise an activity of matching product identifiers of the product in the existing product information, the internal product information, and the external product information. Product identifiers can include but are not limited to a global trade item number (GTIN), a universal product code (UPC), an item identification number specific to the online retailer, a model number plus the brand as a composite key, an identification number specific to a third-party seller, and/or a title. The product identifiers also can be referred to as "strong identifiers" because the product identifiers are identifiers that have a strong chance of identifying a distinct item. In some embodiments, the activity of matching the product identifiers can determine whether existing product information should be compared to the internal product information and/or the external product information before determining the accuracy score. For example, a product identifier from the existing product information can be matched to a product identifier from the internal product information and/or the external product information.

Once the product identifiers are matched, the existing product information can be compared to the internal product information and/or the external product information. In some embodiments, different weights can be assigned to different sources of the internal sources or the external sources. The different weights can reflect how much the online retailer wants to give credit for product information from the source. For example, the more trust the online retailer has for the source, the more weight will be assigned to the source in determining an accuracy score for the existing product information.

As noted above, activity 410 can comprise determining an accuracy score for one or more product attributes of the existing product information using a first set of rules. In many embodiments, the first set of rules can comprise:

$$\text{Accuracy Score } (X) = \frac{\sum_{i}^{n} wi * \sigma x}{\sum_{i}^{n} wi},$$

where x is an attribute of the product in the existing product information, wi is a weight given to the one or more internal sources or the one or more external sources, $\sigma x$ can be a binary function that outputs a value between [0,1] based on a variance of the attribute in the existing product information and the one or more internal sources or the one or more external sources, and n is a number of the one or more internal sources or the one or more external sources. In some embodiments, $\sigma x$ also is equal to a length of a longest matching substring of the one or more internal sources or the one or more external sources divided by a length of a substring in the existing product information.

Method 400 also can comprise an activity 415 of determining if the accuracy score for the one or more product attributes of the existing product information of each product of the plurality of products exceeds a predetermined accuracy threshold or is below the predetermined accuracy threshold. More particularly, activity, 415 can comprise marking a product attribute of the existing product information as correct for scores a<X<1, marking a product attribute of the existing product information for further review for scores b<X<a, and marking a product attribute of the existing product information as incorrect based on the product attributes from other internal and/or external sources for scores 0<X<b, where a<b and a and b are decimal accuracy thresholds between 0 and 1 used as accuracy cutoffs and also used to determine a next action. For example, if the product attribute of the existing information is marked as correct, the product attribute is left as is. In some embodiments, if the accuracy score is b<X<a, a human can review the product attribute. If the product attribute in the existing product information is correct, a human can mark the product attribute in the existing product information as 100%. If the product attribute in the existing information is incorrect, a human can correct the product attribute, and then mark the product attribute in the existing product information as 100% In some embodiments, if the accuracy score is X<b, activity 435 of automatically replacing incorrect product information in the existing product information with correct product information can take place.

In some embodiments, accuracy scores can be used as an input in a search algorithm to provide information in the search algorithm about the quality of the existing product information. This input in the search algorithm also can trigger real-time improvements in using certain attributes identified in search queries to provide matching search results. For example, if a product attribute of existing product information comprises an accuracy score below a predetermined accuracy threshold, then search results will not include one or more products with that product attribute even if the one or more products match the search query. This exclusion of the one or more products from the search results is because there is a high likelihood that the product attribute in the existing product information that matches the search query is incorrect. Thus, in some embodiments, method 400 can optionally comprising an activity 420 of receiving a search query from a user of a web site of the online retailer and also an activity 425 of determining that one or more product attributes of the existing product information of a portion of the plurality of products are related to the search query. Next, method 400 can optionally comprise an activity 430 of coordinating displaying of search results for the online query without the portion of the plurality of products if the accuracy score for the one or more product attributes of the existing product information of the portion of the plurality of products is below the predetermined accuracy threshold.

In many embodiments, method 400 also can optionally comprise an activity 435 of automatically replacing incorrect product information in the existing product information with correct product information from the internal product information or the external product information if the accuracy score does not exceed the predetermined accuracy threshold. For example, if an accuracy score of a product attribute in existing product information has an accuracy score of X<b, the predetermine accuracy threshold, and the online retailer has other internal sources and/or external sources that agree on the product attribute, then the online retailer can automatically replace the incorrect product attribute in the existing product information with the correct product attribute.

Next, method 400 can optionally comprise an activity 440 of coordinating displaying of the existing product information with the correct product information replacing the incorrect product information on a webpage for the product on a website of the online retailer. For example, activity 440 can comprise coordinating displaying of existing product information with a corrected product attribute replacing an incorrect product attribute on a webpage for the product on the website of the online retailer.

In other embodiments, accuracy scores of existing product information can be used in various additional applications. For example, accuracy scores can provide feedback to machine learning-based attribute extraction models to inform the online retailer how well the machine learning-based attribute extraction models are performing. Accuracy scores also can be used to compute validity of an attribute value stored for an item. Accuracy scores also help customers and/or users of the website of the online retailer to see better-quality product information on the website by correcting incorrect product information that was originally part of the catalog of the online retailer. In some embodiments, accuracy scores also can be used to determine the trustworthiness of data for products coming from a data provider. For example, using one or more of the activities described above, system 300 can review product information obtained from a data provider to determine if the product information provided by the data provide is accurate and therefore trustworthy.

FIG. 5 illustrates a block diagram of a portion of system 300 comprising product information storage system 310, web server 320, display system 360 and/or product information accuracy system 370, according to the embodiment shown in FIG. 3. Each of product information storage system 310, web server 320, display system 360 and/or product information accuracy system 370, is merely exemplary and not limited to the embodiments presented herein. Each of product information storage system 310, web server 320, display system 360 and/or product information accuracy system 370, can be employed in many different embodiments or examples not specifically depicted or described herein. In some embodiments, certain elements or modules of product information storage system 310, web server 320, display system 360 and/or product information accuracy system 370, can perform various procedures, processes, and/or acts. In other embodiments, the procedures, processes, and/or acts can be performed by other suitable elements or modules.

In many embodiments, product information storage system can comprise non-transitory memory storage module 512. Memory storage module 512 can be referred to as product information storage module 512. In many embodiments, product information storage module 512 can store computing instructions configured to run on one or more processing modules and perform one or more acts of method 400 (FIG. 4) (e.g., activity 405 of accessing existing product information for a product in a data catalog of an online retailer, and activity 435 of automatically replacing incorrect product information in the existing product information with correct product information from the internal product information or the external product information if the accuracy score does not exceed the predetermined accuracy threshold (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 430 of coordinating displaying of search results for the online query without the portion of the plurality of products if the accuracy score for the one or more product attributes of the existing product information of the portion of the plurality of products is below the predetermined accuracy threshold, and activity 440 of coordinating displaying of the existing product information with the correct product information replacing the incorrect product information on a webpage for the product on a website of the online retailer (FIG. 4)).

In many embodiments product information accuracy system 370 can comprise non-transitory memory storage module 572. Memory storage module 572 can be referred to as product information accuracy module 572. In many embodiments, product information accuracy module 572 can store computing instructions configured to run on one or more processing modules and perform one or more acts of method 400 (FIG. 4) (e.g., activity 410 of determining an accuracy score for the existing product information using a first set of rules that compares the existing product information for the product with (1) internal product information of one or more internal sources internal to the online retailer, or (2) external product information of one or more external sources external to the online retailer, activity 415 of determining if the accuracy score exceeds a predetermined accuracy threshold, activity 420 of receiving a search query from a user of a website of the online retailer, and activity 425 of determining that one or more product attributes of the existing product information of a portion of the plurality of products are related to the search query (FIG. 4)).

Although systems and methods for correcting incorrect product information in an electronic data catalog have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    one or more processors; and
    one or more non-transitory storage devices storing computing instructions configured to run on the one or more processors and perform:
        accessing existing product information for a product in a data catalog of an online retailer;
        determining a respective confidence score for each respective source of one or more internal sources internal to the online retailer and one or more external sources external to the online retailer;
        determining an accuracy score for the existing product information using a first set of rules that:
            comprises:
                a binary function that outputs a value based on a variance of an attribute of the product in the existing product information and the one or more internal sources or the one or more external sources;
                a weight given to either the one or more internal sources or the one or more external sources; and
                a number of the one or more internal sources or the one or more external sources; and
            compares the existing product information for the product with (1) internal product information of the one or more internal sources internal to the online retailer when the respective confidence score for a respective one of the one or more internal sources is above a predetermined threshold or (2) external product information of the one or more external sources external to the online retailer when the respective confidence score for a respective one of the one or more external sources is above the predetermined threshold;
        when the accuracy score exceeds a predetermined accuracy threshold, determining that product information in the existing product information is correct product information;
        when the accuracy score does not exceed the predetermined accuracy threshold, automatically replacing incorrect product information in the existing product information with the correct product information from the external product information; and
        coordinating displaying the existing product information with the correct product information replacing the incorrect product information on a webpage for the product on a website of the online retailer.

2. The system of claim 1, wherein determining the accuracy score for the existing product information using the first set of rules comprises:
    determining when the existing product information matches the internal product information in a database of the online retailer using machine-learned attribute extraction algorithms; and
    automatically marking the existing product information when the existing product information does not match the internal product information.

3. The system of claim 2, wherein the internal product information in the database of the online retailer comprises the internal product information (1) stored in the database of the online retailer and (2) collected by the online retailer from one or more sellers of the product or suppliers of the product.

4. The system of claim 1, wherein determining the accuracy score for the existing product information using the first set of rules comprises:
    crawling a website of one or more first external sources of the one or more external sources to collect first external product information of the external product information; and
    requesting second external product information of the external product information from one or more second external sources of the one or more external sources.

5. The system of claim 1, wherein the one or more non-transitory storage devices storing the computing instructions are further configured to run on the one or more processors and perform:
    matching product identifiers of the product in:
        the existing product information;
        the internal product information; and
        the external product information.

6. The system of claim 1, wherein the first set of rules comprises:

$$\text{Accuracy Score } (X) = \frac{\sum_{i}^{n} wi * \sigma x}{\sum_{i}^{n} wi},$$

where:
    x is the attribute of the product in the existing product information;
    wi is the weight given to either the one or more internal sources or the one or more external sources;
    σx is the binary function that outputs the value based on the variance of the attribute in the existing product information and the one or more internal sources or the one or more external sources; and
    n is the number of the one or more internal sources or the one or more external sources.

7. The system of claim 6, wherein:
    σx is also equal to a length of a longest matching substring of the one or more internal sources or the one or more external sources divided by a length of a substring in the existing product information.

8. The system of claim 1, wherein:
    determining the accuracy score for the existing product information using the first set of rules comprises:

determining when the existing product information matches the internal product information in a database of the online retailer using machine-learned attribute extraction algorithms;
automatically marking the existing product information when the existing product information does not match the internal product information;
crawling a website of one or more first external sources of the one or more external sources to collect first external product information of the external product information; and
requesting second external product information of the external product information from one or more second external sources of the one or more external sources;
the internal product information in the database of the online retailer comprises the internal product information (1) stored in the database of the online retailer and (2) collected by the online retailer from one or more sellers of the product or suppliers of the product;
the one or more non-transitory storage devices storing the computing instructions are further configured to run on the one or more processors and perform:
matching product identifiers of the product in the existing product information, the internal product information, and the external product information;
the first set of rules comprises:

$$\text{Accuracy Score }(X) = \frac{\sum_{i}^{n} wi * \sigma x}{\sum_{i}^{n} wi},$$

where:
x is the attribute of the product in the existing product information;
wi is the weight given to either the one or more internal sources or the one or more external sources;
σx is the binary function that outputs the value based on the variance of the attribute in the existing product information and the one or more internal sources or the one or more external sources; and
n is the number of the one or more internal sources or the one or more external sources; and
σx is also equal to a length of a longest matching substring of the one or more internal sources or the one or more external sources divided by a length of a sub string in the existing product information.

9. A method being implemented via execution of computing instructions configured to run at one or more processors and configured to be stored at non-transitory computer-readable media, the method comprising:
accessing existing product information for a product in a data catalog of an online retailer;
determining a respective confidence score for each respective source of one or more internal sources internal to the online retailer and one or more external sources external to the online retailer;
determining an accuracy score for the existing product information using a first set of rules that:
comprises:
a binary function that outputs a value based on a variance of an attribute of the product in the existing product information and the one or more internal sources or the one or more external sources;
a weight given to either the one or more internal sources or the one or more external sources; and
a number of the one or more internal sources or the one or more external sources; and
compares the existing product information for the product with (1) internal product information of the one or more internal sources internal to the online retailer when the respective confidence score for a respective one of the one or more internal sources is above a predetermined threshold or (2) external product information of the one or more external sources external to the online retailer when the respective confidence score for a respective one of the one or more external sources is above the predetermined threshold;
when the accuracy score exceeds a predetermined accuracy threshold, determining that product information in the existing product information is correct product information;
when the accuracy score does not exceed the predetermined accuracy threshold, automatically replacing incorrect product information in the existing product information with the correct product information from the external product information; and
coordinating displaying the existing product information with the correct product information replacing the incorrect product information on a webpage for the product on a website of the online retailer.

10. The method of claim 9, wherein determining the accuracy score for the existing product information using the first set of rules comprises:
determining when the existing product information matches the internal product information in a database of the online retailer using machine-learned attribute extraction algorithms; and
automatically marking the existing product information when the existing product information does not match the internal product information.

11. The method of claim 10, wherein the internal product information in the database of the online retailer comprises the internal product information (1) stored in the database of the online retailer and (2) collected by the online retailer from one or more sellers of the product or suppliers of the product.

12. The method of claim 9, wherein determining the accuracy score for the existing product information using the first set of rules comprises:
crawling a website of one or more first external sources of the one or more external sources to collect first external product information of the external product information; and
requesting second external product information of the external product information from one or more second external sources of the one or more external sources.

13. The method of claim 9, wherein the method further comprises matching product identifiers of the product in:
the existing product information;
the internal product information; and
the external product information.

14. The method of claim 9, wherein the first set of rules comprises:

$$\text{Accuracy Score } (X) = \frac{\sum_{i}^{n} wi * \sigma x}{\sum_{i}^{n} wi},$$

where:
- x is the attribute of the product in the existing product information;
- wi is the weight given to either the one or more internal sources or the one or more external sources;
- σx is the binary function that outputs the value based on the variance of the attribute in the existing product information and the one or more internal sources or the one or more external sources; and
- n is the number of the one or more internal sources or the one or more external sources.

15. The method of claim 14, wherein:
σx is also equal to a length of a longest matching substring of the one or more internal sources or the one or more external sources divided by a length of a substring in the existing product information.

16. The method of claim 9, wherein:
determining the accuracy score for the existing product information using the first set of rules comprises:
- determining when the existing product information matches the internal product information in a database of the online retailer using machine-learned attribute extraction algorithms;
- automatically marking the existing product information when the existing product information does not match the internal product information;
- crawling a website of one or more first external sources of the one or more external sources to collect first external product information of the external product information; and
- requesting second external product information of the external product information from one or more second external sources of the one or more external sources;

the internal product information in the database of the online retailer comprises the internal product information (1) stored in the database of the online retailer and (2) collected by the online retailer from one or more sellers of the product or suppliers of the product;

the method further comprises matching product identifiers of the product in the existing product information, the internal product information, and the external product information;

the first set of rules comprises:

$$\text{Accuracy Score } (X) = \frac{\sum_{i}^{n} wi * \sigma x}{\sum_{i}^{n} wi},$$

where:
- x is the attribute of the product in the existing product information;
- wi is the weight given to either the one or more internal sources or the one or more external sources;
- σx is the binary function that outputs the value based on the variance of the attribute in the existing product information and the one or more internal sources or the one or more external sources; and
- n is the number of the one or more internal sources or the one or more external sources; and σx is also equal to a length of a longest matching substring of the one or more internal sources or the one or more external sources divided by a length of a sub string in the existing product information.

17. A system comprising:
one or more processors; and
one or more non-transitory storage devices storing computing instructions configured to run on the one or more processors and perform:
- accessing respective existing product information for each respective product of a plurality of products in a data catalog of an online retailer, the respective existing product information comprising one or more respective product attributes;
- determining a respective confidence score for each respective source of one or more respective internal sources internal to the online retailer and one or more respective external sources external to the online retailer;
- determining a respective accuracy score for each respective product attribute of the one or more respective product attributes of the respective existing product information of each respective product of the plurality of products using a first set of rules that:
  comprises:
  - a binary function that outputs a value based on a variance of an attribute of the product in the respective existing product information and the one or more respective internal sources or the one or more respective external sources;
  - a weight given to either the one or more respective internal sources or the one or more respective external sources; and
  - a number of the one or more respective internal sources or the one or more respective external sources; and compares the respective existing product information for the each respective product with (1) respective internal product information of the one or more respective internal sources internal to the online retailer when the respective confidence score for a respective one of the one or more respective internal sources is above a predetermined threshold or (2) respective external product information of the one or more respective external sources external to the online retailer when the respective confidence score for a respective one of the one or more respective external sources is above the predetermined threshold;
- determining when the respective accuracy score for a respective product attribute of the one or more respective product attributes of the respective existing product information of each respective product of the plurality of products is below a predetermined accuracy threshold;
- in response to determining when the respective accuracy score is below the predetermined accuracy threshold, automatically replacing respective incorrect product information in the respective existing product information with respective correct product information from (1) the respective internal product information or (2) the external product information when the respective accuracy score for the respective product attribute of the one or more respective product attributes of the respective existing product information of a respective product of the plurality of products is below the predetermined accuracy threshold;

receiving a search query from a user of a website of the online retailer;

determining that the respective product attribute of the one or more respective product attributes of the respective existing product information of at least a portion of the plurality of products are related to the search query; and coordinating displaying search results for the search query without the at least the portion of the plurality of products when the respective accuracy score for the one or more respective product attributes of the respective existing product information of the at least the portion of the plurality of products is below the predetermined accuracy threshold.

18. The system of claim 17, wherein the one or more non-transitory storage devices storing the computing instructions are further configured to run on the one or more processors and perform:

coordinating displaying the respective existing product information with the respective correct product information replacing the respective incorrect product information on a webpage for any product of the plurality of products on the web site of the online retailer.

19. The system of claim 17, wherein:

determining the respective accuracy score for each respective product attribute of the one or more respective product attributes of the respective existing product information of each respective product of the plurality of products comprises:

determining when the respective existing product information matches the respective internal product information in a database of the online retailer using machine-learned attribute extraction algorithms;

automatically marking the respective existing product information when the respective existing product information does not match the respective internal product information;

crawling a website of one or more first external sources of the one or more respective external sources to collect first external product information of the external product information; and requesting second external product information of the external product information from one or more second external sources of the one or more respective external sources.

20. The system of claim 17, wherein the first set of rules comprises:

$$\text{Accuracy Score } (X) = \frac{\sum_{i}^{n} wi * \sigma x}{\sum_{i}^{n} wi},$$

where:

x is the attribute of the product in the respective existing product information;

wi is the weight given to either the one or more respective internal sources or the one or more respective external sources;

σx is the binary function that outputs the value based on the variance of the attribute in the respective existing product information and the one or more respective internal sources or the one or more respective external sources; and n is the number of the one or more respective internal sources or the one or more respective external sources.

* * * * *